KEESE, WARD & WILKISON
Flood Gate.
No. 33,201.
Patented Sept. 3, 1861.
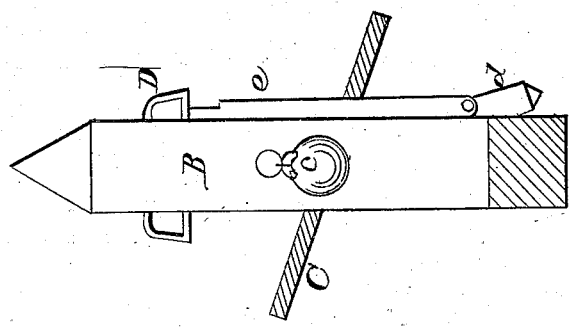
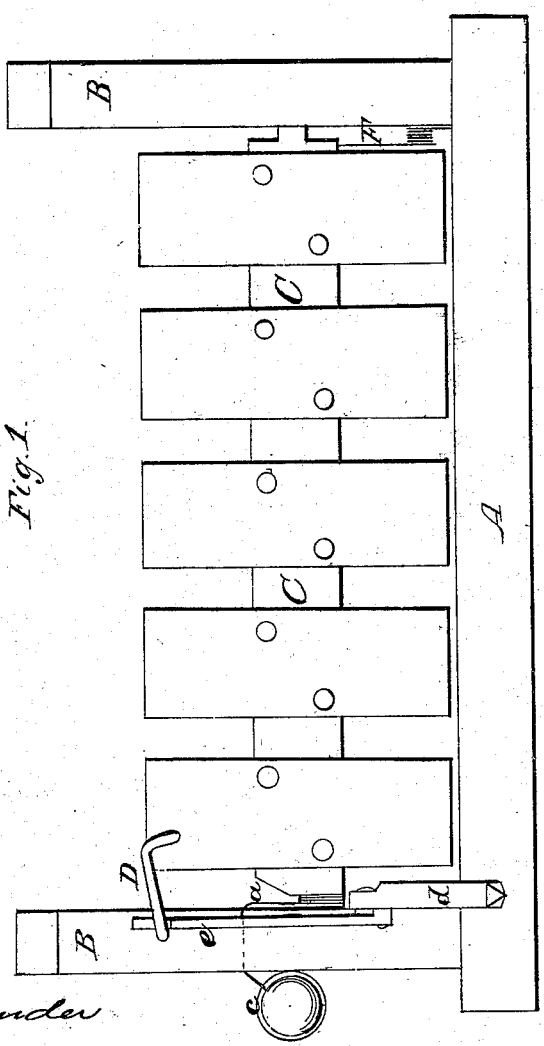
Witnesses.
Inventor

UNITED STATES PATENT OFFICE.

R. KEESE, D. T. WARD, AND J. G. WILKISON, OF CARDINGTON, OHIO.

IMPROVEMENT IN FLOOD-GATES.

Specification forming part of Letters Patent No. 33,201, dated September 3, 1861.

*To all whom it may concern:*

Be it known that we, R. KEESE, D. T. WARD, and J. G. WILKISON, of Cardington, Morrow county, Ohio, have invented certain new and useful Improvements in Flood-Gates; and we do hereby declare that the following a is full, clear, and exact description of the same, reference being had to the accompanying drawing, and to the letters of reference marked thereon.

In the annexed drawing, making part of this specification, A represents a sill, upon which is erected two standards B B.

C represents the gate, which consists of an axle with slats secured crosswise upon it. The axle is provided with journals upon each end, and these journals play in proper journal-boxes in the standards B B.

$a$ represents a cord, which is secured to the gate-axle at one end. This cord passes through an opening in one of the standards and has a weight attached to its other end. The weight and cord are for the purpose of returning the gate to a closed position after it has been opened.

D represents a latch, which is secured to one of the standards loosely, so that it will fall upon one of the slats of the gate when necessary for the purpose of holding the gate shut.

$d$ is a float, which is pivoted to one of the standards near its lower end, and which is also pivoted to a connecting-rod $e$. The connecting-rod $e$ stands by the side of one of the standards, and is provided with a shoulder near its upper end, which catches under the latch D and serves to operate said latch.

The float $d$ is secured to the standard at any desired height, so that when the water rises to this height the gate may be opened. When the water rises to the height of the float, its outer end, which is free, rises with the water. As the float rises, the connecting-rod $e$ moves vertically and operates upon the latch, which is raised. The gate is thus freed, so that it can turn upon its axle, allowing the water to pass through freely, and with it the usual drift-wood found in high water. When the water recedes, the float falls and so does the rod and latch. The weight and cord then restore the gate to its proper position.

F is a spring, which assists the weight and cord in this operation at the other side of the gate.

Having thus fully described our invention, what we claim as new, and desire to secure by Letters Patent, is—

The employment of the gate C when operated as set forth through the medium of the cord $a$, weight $c$, float $d$, connecting-rod $e$, and latch D, for the purpose specified.

R. KEESE.
D. T. WARD.
J. G. WILKISON.

Witnesses:
W. H. SHANK,
THOS. C. THOMSON.